COMMUNICATION SYSTEM

Filed Feb. 7, 1957

INVENTOR
BRUCE L. MEYER

BY Cushman, Darby & Cushman
ATTORNEYS

United States Patent Office 3,068,416
Patented Dec. 11, 1962

3,068,416
COMMUNICATION SYSTEM

Bruce L. Meyer, Bloomington, Minn., assignor to Sperry Rand Corporation, New York, N.Y., a corporation of Delaware Filed Feb. 7, 1957, Ser. No. 638,769
6 Claims. (Cl. 325—61)

This invention relates generally to communication systems, and more specifically to communication systems having negligible frequency translation.

In a carrier type communications system, the information frequencies modulate a transmitter frequency termed a carrier frequency. The resultant modulated wave consists of an unmodulated carrier component plus two sidebands. Generally, only one sideband is transmitted to a receiving station. At the receiver a locally generated frequency is heterodyned with the transmitted sideband to reproduce the modulating information frequencies. In practice, the receiver and transmitter generated frequencies will be slightly different causing the reproduced signal to be frequency translated with respect to the original modulating frequencies.

This frequency translation may be tolerated in amplitude modulated systems but may cause loss of information in a high speed phase-modulated digital communication system. In a phase-modulated system with an information transfer rate of one carrier cycle per information bit (binary digit) or more, translation of even one cycle per second can affect the validity of the received data. For example, where the receiving reference frequency is higher than the carrier frequency, additional false information will be inserted and similarly when the situation is reversed information bits will be lost.

To obviate frequency translation in a communication system, this invention provides for the compensation of any such translation so that the intelligence signal will be reproduced without loss of information. To accomplish this in one embodiment of this invention, a second signal, herein termed a "pilot signal," is introduced into the system. This pilot signal has a frequency which is related to the average frequency of the intelligence signal by a predetermined ratio. Preferably, the pilot signal is an even subharmonic of the intelligence signal, but such a relationship is not necessary for this invention. Since both the intelligence and pilot signals will be frequency translated equally so that their frequency difference remains the same, the two signals will not be related to each other by their original ratio after such translation. By this invention, there is a detection of such translation and the change of frequency ratio. The locally generated heterodyned frequency is then changed an amount corresponding to the amount of frequency translation in the system so that the detected signals become of the same frequency as the original intelligence and pilot signals.

This invention also encompasses the use of two different pilot frequencies having a predetermined ratio by which frequency translation of the intelligence signal is corrected. Additionally, the invention includes frequency translation correction by comparing a single frequency of demodulated sidebands with its subcarrier frequency or of two sidebands, one from the intelligence carrier and the other from a subcarrier. In any case, if the frequencies of the sidebands when demodulated and equated differ, correction is obtainable by this invention. The term "pilot signal" as used herein is meant to include any signal by which frequency translation correction may be accomplished in accordance with this invention.

It is, therefore, the primary object of this invention to provide a communication system including apparatus for compensating and correcting frequency tranlation therein.

Another object of this invention is to provide receiving apparatus which compensates for frequency translation in a conventional communication system.

Another object of this invention is to provide apparatus for use with conventional communication terminal equipment whereby intelligence received by said terminal in a frequency translated form is frequency compensated to provide an accurate intelligence signal.

Another object in conjunction with the preceding object is the provision of means for mixing the intelligence signal as received from said terminal with a carrying wave so that the resultant signals may be demodulated with an oscillator changeable in frequency in accordance with the amount of frequency translation whereby the intelligence signal is reproduced without significant frequency translation.

Yet another object of this invention is to provide a method for detecting and obviating frequency translation in a communication system.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figures 1, 2, 3:
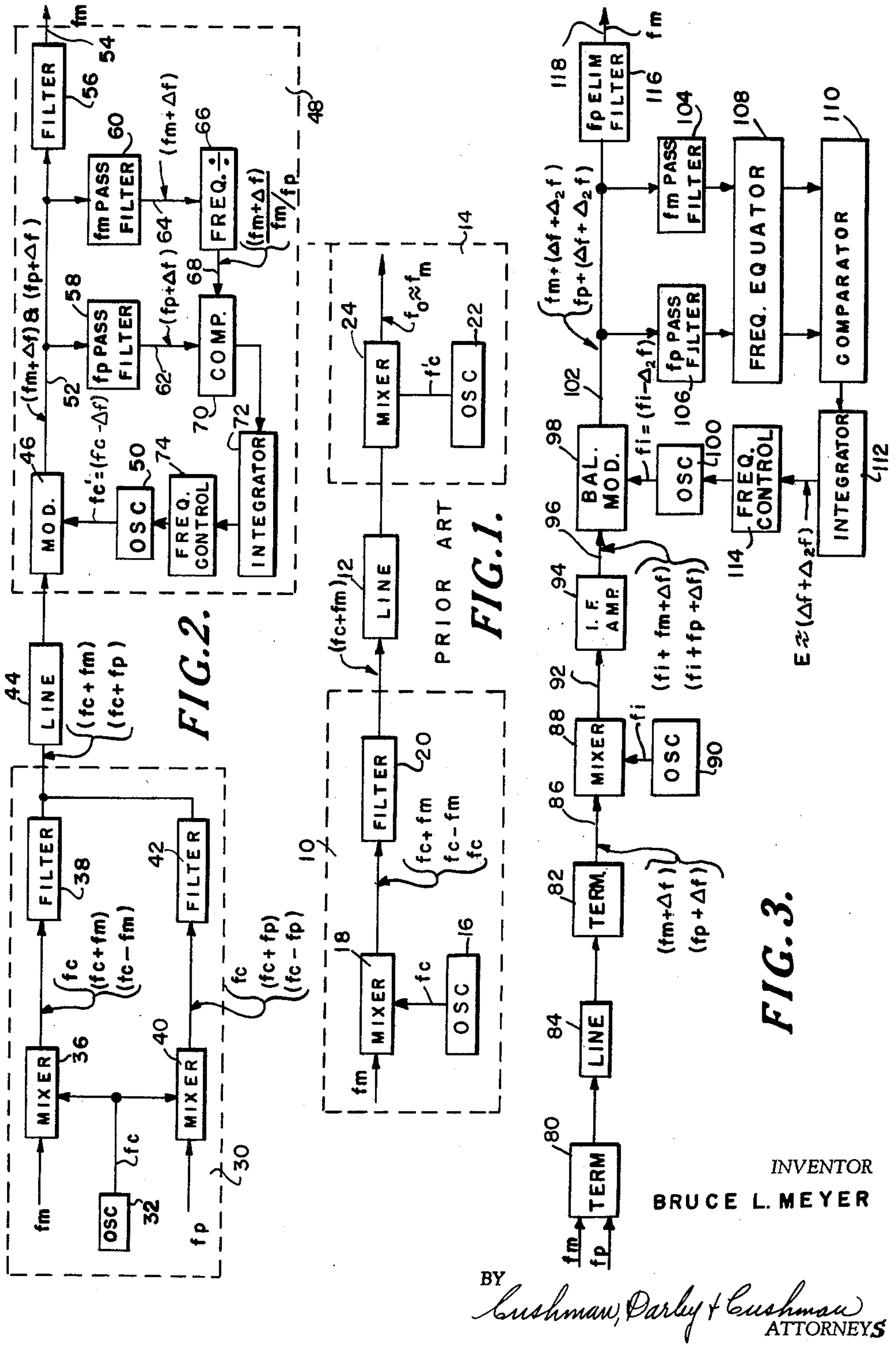
FIGURE 1 is a diagrammatic illustration of a prior art communicating system.
FIGURE 2 is a diagrammatic illustration of a transmitter and receiver for a communicating system according to the present invention.
FIGURE 3 is a diagrammatic illustration of a modification of the invention.

The prior art as illustrated in FIGURE 1 includes a transmitter 10 connected through a conveying means such as line 12 to receiver 14. A typical communications transmitter may consist of an oscillator 16, non-linear mixer 18, and a single sideband pass filter 20. The phase modulated signal of frequency $f_m$ may be heterodyned with the carrier frequency $f_c$ from oscillator 16 in mixer 18 to produce two primary sideband frequencies $(f_c+f_m)$ and $(f_c-f_m)$, in addition to carrier frequency $f_c$. Sideband filter 20 is made to pass only the upper sideband $(f_c+f_m)$ to the carrier transmission line 12.

It is to be understood that the signal with frequency $f_m$ as used herein may be a subcarrier, which may or may not be carrying its own modulation, or may itself be providing digital information as it is modulated onto the carrier wave $f_c$, and in either case, is termed herein an "intelligence signal."

A typical prior art communications receiver as illustrated in FIGURE 1, includes an oscillator 22 and a non-linear mixer 24. In the receiver, the received sideband $(f_c+f_m)$ is heterodyned in the mixer 24 with a locally generated frequency from oscillator 22. Ideally, the frequency of oscillator 22 is the same as the frequency of the transmitter oscillator 16. However, in practice, the frequency of oscillation of the two oscillators 16 and 22 will invariably be different. Therefore, the frequency of oscillator 22 is designated $f_c'$. When this oscillator frequency is mixed with the upper sideband to demodulate same, an output frequency $f_o$, which is equal to $$f_c+f_m-f_c'$$

is produced along with other frequencies which are here of no relevance. Only when $f_c'=f_c$ will $f_o=f_m$, and only then will $f_o$ and $f_m$ have a constant phase difference.

When utilizing carrier equipment to transfer phase modulated waves, it is necessary to make $f_o=f_m$. This is accomplished by this invention by the introduction of at least one pilot frequency $f_p$, preferably unmodulated, into the carrier system. The pilot frequency may be higher or lower than the phase modulated subcarrier frequency $f_m$, and may be related thereto in any desired ratio, but the pilot frequency $f_p$ is preferably a subharmonic of the modulating frequency $f_m$. An even greater preference is expressed by the power-of-two relationship $f_m=(2^n)(f_p)$, where $n$ is a positive integer. However, it is to be understood that any fixed relationship between $f_p$ and $f_m$, whether harmonic or not and regardless of which is the larger, is intended to be included within this invention. As an example, without limitation intended, the carrier frequency $f_c$ may be from 10 to 50 kilocycles depending on the voice channel selected for use, while a typical subcarrier modulating frequency $f_m$ in a phase modulated digital communication system utilizing telephone channels may be 1600 cycles per second. Under such conditions, the pilot frequency $f_p$ would preferably be 400 c.p.s. With these relationships in mind, the following description of the invention will be more easily understood.

In FIGURE 2, there is illustrated a transmitter 30, which is similar to transmitter 10 of FIGURE 1 except that it is modified to receive and mix the pilot frequency $f_p$ into the line. This is accomplished in a manner similar to that for providing the sideband having frequency $f_m$ therein. The carrier frequency $f_c$ is produced by oscillator 32 and is heterodyned in mixer 36 with the subcarrier modulating frequency $f_m$. Filter 38 removes all of the output from mixer 36 except the upper sideband $(f_c+f_m)$. The carrier frequency $f_c$ is also heterodyned in mixer 40 with pilot frequency $f_p$ to produce sum and difference frequencies $(f_c+f_p)$ and $(f_c-f_p)$ along with the carrier frequency $f_c$. The upper sideband $(f_c+f_p)$ is passed by filter 42 to line 44 along with the sideband $(f_c+f_m)$. It is to be understood that the invention is not limited to any particular transmitter for producing the two carrier modulated signals $(f_c+f_m)$ and $(f_c+f_p)$, but that transmitter 30 is only one means for producing same. It is also to be understood that this invention is not limited to the use of upper sidebands, but that the filters 38 and 42 may pass only the lower sidebands, or that one may pass the upper sideband, while the other passes the lower sideband.

Line 44 in FIGURE 2 passes the two sidebands to a balanced modulator 46 contained in receiver 48 for demodulating purposes. The balanced modulator may be of any suitable type, such as for example, the transformer connected crystal diode bridge illustrated on page 410 of the first edition, McGraw-Hill, New York, Radiation Laboratory Series, volume 19 entitled "Waveforms," 1949. Local oscillator 50 causes demodulation to take place in the demodulator 46. In this manner the sidebands are removed from the carrier $f_c$. However, if the frequency of oscillator 50 is not the same as the frequency of oscillator 32 in the transmitter, there will be a translation of the modulating frequency $f_m$ and the pilot frequency $f_p$. That is, if oscillator 50 provides a frequency $f_c'$ which varies from carrier frequency $f_c$ by an amount $\Delta f$ so that $f_c'=(f_c-\Delta f)$, the output of demodulator 46 will include the frequencies $(f_m+\Delta f)$ and $(f_p+\Delta f)$. Therefore, the frequencies $f_m$ and $f_p$ are translated an amount equal to $\Delta f$. In order to correct the output of the demodulator so that frequencies on line 52 are $f_m$ and $f_p$ with the output on line 54 being only frequency $f_m$ since band elimination filter 56 removes frequency $f_p$, the frequency of oscillator 50 is controlled in accordance with the amount of translation; that is, according to the frequency $\Delta f$.

To control the frequency of oscillator 50, two band pass filters 58 and 60 are connected to line 52 to pass, respectively, a narrow band of frequencies around the pilot frequency $f_p$ and the intelligence frequency $f_m$. Therefore, the output on line 62 from filter 58 has a frequency of $(f_p+\Delta f)$ while the output on line 64 from filter 60 has a frequency of $(f_m+\Delta f)$. Assuming, for the sake of example, that the original ratio of $f_m/f_p$ was 4, as these respective frequencies were introduced into transmitter 30, it will be apparent that the ratio of the signals on lines 64 and 62 when the respective signals thereon are translated an amount $\Delta f$, is not equal to the original ratio 4. This is true since when two frequencies are related by a predetermined ratio, they cannot be so related after each has been changed an equal amount. This invention takes advantage of this principle by equating and comparing the frequencies issuing from filters 58 and 60. As a specific embodiment, the signal on line 64 is frequency divided so as to equal the frequency of the signal on line 62 when no translation is present in either of the signals. In the example previously set forth wherein the ratio $f_m/f_p=4$, the frequency divider 66 divides the frequency of the signal on line 64 by the factor 4. The divider frequency as produced on line 68 is then compared in comparator 70 with the frequency of the signal on line 62. A comparator suitable for comparing the frequencies may be one which compares the phases of the frequencies. Such comparators are well known in the art, such as for example, the one illustrated in figure 14.16 on page 513 of volume 19 of the Radiation Laboratory Series entitled "Waveforms," McGraw-Hill, New York, first edition, 1949.

Upon detection of a phase or frequency difference, the comparator produces an output which is related to the amount of frequency translation $\Delta f$. The comparator output is then integrated in integrator 72 which may be, for example, a simple resistor-capacitance-inductance type filter with a time constant of approximately 100 milliseconds, no limitation thereto being intended. The integrator smooths the output signal from comparator 70, thereby preventing comparatively rapid information phase shifts in the subcarrier modulating frequency $f_m$ from affecting the control of the frequency of oscillator 50. The integrator produces a D.C. voltage which is applied to a frequency control circuit 74, which circuit may include a remote cutoff thermionic vacuum pentode connected as a reactance tube. In a conventional Miller-type reactance tube circuit, wherein the transconductance of the pentode is varied, a less negative control grid bias increases the transconductance, thereby increasing the effective grid to plate capacitance. When such capacitance is coupled to the tuned tank circuit (not shown) of oscillator 50, a more positive grid bias on the reactance tube in the frequency control circuit 74 lowers the resonant frequency of the oscillator tank circuit. Therefore, as the frequency of oscillator 50 drifts with respect to the frequency of the transmitting oscillator 32, the drift is detected by comparator 70 which feeds back a signal to the oscillator 50 to correct the frequency of oscillation thereof. The output signals on line 52, after such correction, have a frequency of $f_m$ and $f_p$ respectively without any translation being present. The receiver output on line 54 then is purely the intelligence signal $f_m$.

As previously mentioned, the frequency ratio of signals $f_m$ and $f_p$ may be as desired. When they are related by a power-of-two, bistable devices may be conveniently used to equate the two frequencies. In the specific example stated above as to an $f_m/f_p$ ratio of 4, the frequency divider 66 in FIGURE 2 may take the form of a modulo-4 counter comprising electronic flip-flops as is well known in the art. However, frequency $f_p$ may be larger than frequency $f_m$, as well as vice versa, and in either case, the ratio of the two frequencies may be an improper fraction reducible only to a mixed number. When the ratio is such an improper fraction, the frequency equating means may take the form of not only a frequency divider, but also a frequency multiplier, or the latter alone. For example, if $f_m/f_p=8/5$, the output from filter 60 could first be multiplied by 5, then divided by 8, so that the input to the comparator, if there were no frequency translation, would be of the same phase and frequency as the output from filter 58. Similarly, assuming the same 8/5 ratio, the output from filter 58 could be frequency divided by 5, while the output from filter 60 is frequency divided by 8. In any case, the filter outputs would be effectively divided so that the resulting signals, when not otherwise frequency translated, would be of equal frequency and of constant phase difference. If the ratio of $f_m/f_p$ were inverted to be 5/8, the frequency equating system could be reversed so as to cause equal resultant frequencies in the absence of other frequency translation. Therefore, it is apparent that the pilot frequency as translated if at all, or any appropriate frequency derived therefrom, may be compared to the intelligence signal frequency $f_m$ as similarly translated, or any appropriate signal derived therefrom, in the comparator 70.

As previously mentioned, it is preferred that frequency $f_p$ be lower than frequency $f_m$. This is for the reason that division of frequency $f_m$ also divides the comparatively rapid information phase shifts due to the subcarrier modulating frequency $f_m$. Such phase shifts are in this way minimized so as not to substantially affect the comparison of the phases of the two signals in the comparator 70. There will be some such phase shift present, however, and the output signal from comparator 70 will reflect such phase shifts. To further minimize the effect of such phase shifts, the time constant of integrator 72 is made large enough to eliminate signals due to such phase shifts so that the oscillator 50 will not be affected thereby to distort the signals from line 44. However, at the same time, the time constant of the integrator must remain small enough to compensate for the largest possible frequency translation. As the frequency translation increases the rate of phase change likewise increases. The phase changes are averaged to zero by the integrator. The slower the filter, i.e., the longer the time constant, the smaller the frequency translation must be if correction is to be made. As the frequency rate of the modulating information frequency $f_m$ becomes higher, the integrator should be faster, i.e., of shorter time constant, but this is limited by the amount of integration signal that may be effectively passed to the oscillator 50. That is, the speed of response of the integrator must be adequate to permit oscillator frequency correction to take place in the presence of a small frequency difference of progressive phase difference, and must be at a rate which progressively reduces the rate of change of phase difference until a condition of control phase difference is obtained. Therefore, a suitable time constant may be provided by integrator 72 upon selection of reasonable values for the components therein in accordance with the factors above mentioned.

This invention is useful to correct frequency translation in any carrier system by addition of translation corrector equipment at intermediary points in the system, and/or at the receiving terminals thereof when a pilot frequency is introduced into the system. Such translation corrector equipment corrects for the net frequency translation in the whole system prior to the location of such equipment, whether the frequency translation is due to drift of any one or more of the oscillators in the system or in the correcting equipment, or whether such translation is due to other frequency changing forces. Several translation correctors may be installed at different points in a carrier system to correct for compounded frequency translations greater than that which may be compensated for by a signal translation corrector.

A frequency translation corrector as connected to a telephone terminal of a conventional carrier system is illustrated in FIGURE 3. Representative of a conventional carrier system, among others, are the J, K, and L Bell telephone carrier systems. As a specific example of a carrier system, reference may be had to the L-3 Bell carrier system as fully described in the July 1953, #4 issue of volume 32 of "The Bell System Technical Journal" beginning at page 779. Such a system is capable of handling 1860 telephone channels or 600 telephone channels and a television channel. The terminals 80 and 82 in FIGURE 3 may be conventional such as the telephone terminals particularly referred to beginning at page 820 in the above mentioned journal or the television terminals described in said journal beginning on page 915 thereof.

In accordance with this invention, not only the intelligence frequency $f_m$ is present in the system, but also a pilot frequency $f_p$. Terminal 80 upon receipt of both these frequencies mixes them with the desired carrier wave and produces frequency translated modulated signals, the proper sidebands of which are propagated along line 84. Terminal 82 detects the two signals $f_m$ and $f_p$. However, if the detection does not fully compensate for the frequency translation effected in terminal 80 or by virtue of transmission over line 84, the output signals on line 86 will be slightly different than the original frequencies $f_m$ and $f_p$. That is, the signals on line 86 may be changed by an amount $\Delta f$ so as to be $(f_m+\Delta f)$ and $(f_p+\Delta f)$. To compensate for such frequency translation, the remaining equipment of FIGURE 3 is utilized. The translated signals are heterodyned in mixer 88 with an intermediate frequency $f_i$ provided by an oscillator 90 to produce upper and lower sidebands for each of the input signals from line 86. That is, on line 92 besides the fundamental intermediate frequency second harmonics, there will be signals $f_i\pm(f_m+\Delta f)$ and $f_i\pm(f_p+\Delta f)$. Either the upper or lower sidebands are removed by circuit 94, which may also provide amplification of the retained sidebands. Assuming circuit 94 removes the lower sidebands, the signals thereby conveyed to line 96 will be $(f_i+f_m+\Delta f)$ and $(f_i+f_p+\Delta f)$.

The circuitry to the right of line 96 represents a receiver similar to receiver 48 of FIGURE 2 except that the frequency equating system is represented in a more general form. The signals on line 96 are received by a balanced modulator 98 which mixes the signal from oscillator 100 therewith. If the oscillator 100 produces the same frequency as oscillator 90, demodulation in modulator 98 will produce signals on line 102 of frequency the same as the signals emerging from telephone terminal 82. If such emerging signals are frequency translated by an amount $\Delta f$, the signals on line 102 will likewise be frequency translated $\Delta f$. To obviate such frequency translation, the frequency of oscillator 100 is regulated to compensate therefor. Letting the frequency of oscillator 100 be $f_i'$ and equal to $(f_i-\Delta_2 f)$, it is apparent that the frequency of oscillator 100 must be changed an amount equal to the sum of the frequency increments $\Delta f$ and $\Delta_2 f$. The signals on line 102 after demodulation by frequency $f_i'$ include $(f_m+\Delta f+\Delta_2 f)$ and $$(f_p+\Delta f+\Delta_2 f)$$

When these signals are respectively passed by filters 104 and 106, and frequency equated in circuit 108, the comparison thereof in circuit 110 will provide a signal to integrator 112 when frequency translation is present in the system. The output voltage of integrator 112 as delivered to oscillator 100 through the frequency control circuit 114, is proportional to the quantity $(\Delta f+\Delta_2 f)$. Such voltage from the integrator 112 will cause the frequency of oscillator 100 to change and to become $(f_i+\Delta f)$. When this frequency is added to the incoming frequencies on line 96, the output signals on line 102 are $f_m$ and $f_p$ respectively. Therefore, after removal of signal $f_p$ by the elimination filter 116, the output signal on line 118 is of the desired frequency $f_m$.

It will be apparent from the above discussion relative to FIGURE 3 that the corrector system, including all the circuitry to the right of line 86, compensates for any frequency translation occurring before or after line 86 as long as the amount thereof is within the capabilities of the receiver. That is, any frequency translation due to difference in oscillation frequencies in the terminals 80, 82 or due to shift of the frequency in line 84 or from any other cause, as well as translation due to difference in the frequencies of oscillators 90 and 100 will be completely compensated for so that the receiver output frequency is the same as the intelligence signal input frequency to the terminal 80. This system is capable of correcting for frequency translations not only of an amount such as 20 c.p.s. which makes a voice sound unnatural, but also for frequency translations of only a few cycles per second, and thus provides quality sufficient for all present day carrier systems.

Although the invention has been described with reference to comparing the frequencies of a pilot signal $f_p$ and an intelligence signal $f_m$ after demodulation thereof, the invention includes the use of any two signals in a communication system for frequency translation correction. That is, the signal $f_m$ may itself be a pilot signal or the like along with pilot signal $f_p$, both being at different frequencies than the true information signal. Comparison of the ratio of the two pilot signals with the apparatus above described will cause correction of any frequency translation.

In addition, the invention encompasses the comparison of the frequencies of any two sidebands whether same are modulated on the intelligence carrier wave or on a subcarrier. For example, the modulation of a subcarrier with a signal produces an upper and lower sideband which without any frequency translation might have a frequency ratio which may be detected in the manner above described. Also, two pilot signals may be employed for correction purposes with one such signal modulating the intelligence carrier, while the other modulates a subcarrier. As long as two sidebands are present, regardless of their origin, frequency translation may be compensated for and corrected in accordance with this invention.

Thus it is apparent that there is provided by this invention systems in which the various phases, objects and advantages herein set forth are successfully achieved.

Modifications of this invention not described herein will become apparent to those of ordinary skill in the art. Therefore, it is intended that the matter contained in the foregoing description and accompanying drawings be interpreted as illustrative and not limitative, the scope of the invention being defined in the appended claims.

What is claimed is:

1. In a communication system, the combination comprising: transmitting means including a source of carrier frequency signals, means for modulating said carrier frequency signals with first and second signals, said first and second signals being related by a predetermined frequency ratio, to produce third and fourth signals; receiving means receptive of said third and fourth signals including oscillator means substantially tuned to the same frequency as said carrier signal, frequency control means connected to said oscillator and responsive to an error signal for adjusting the frequency of said oscillator, a demodulator for operating on said third and fourth signals for producing a pair of signals of substantially the same frequency as said first and second signals, respectively, when said oscillator is properly tuned, means for effectively dividing one of said pair of signals by said predetermined ratio, and means for comparing the other of said pair of signals and the effectively divided signal to produce said error signal when there is a frequency difference between the compared signals.

2. In a communication system, the combination comprising: transmitting means including a source of carrier frequency signals, means for modulating said carrier frequency signals with first and second signals, said first and second signals being related by a predetermined frequency ratio, to produce third and fourth signals; receiving means receptive of said third and fourth signals including oscillator means whose output is subject to frequency translation substantially tuned to the same frequency as said carrier signal, frequency control means connected to said oscillator and responsive to an error signal proportional to the degree of frequency translation present, for adjusting the frequency of said oscillator, a demodulator for operating on said third and fourth signals for producing a pair of signals of substantially the same frequency as said first and second signals, respectively, when said oscillator is properly tuned, means for effectively dividing one of said pair of signals by said predetermined ratio, and means for comparing the other of said pair of signals and the effectively divided signal, to produce said error signal when there is a frequency difference between the compared signals.

3. In a communication system, the combination comprising: transmitting means including a source of carrier frequency signals, means for modulating said carrier frequency signals with first and second signals, said first and second signals being related by a predetermined frequency ratio, to produce third and fourth signals; receiving means receptive of said third and fourth signals including oscillator means substantially tuned to the same frequency as said carrier signal, frequency control means connected to said oscillator and responsive to an error signal for adjusting the frequency of said oscillator, a demodulator for operating on said third and fourth signals for producing a pair of signals of substantially the same frequency as said first and second signals, respectively, when said oscillator is properly tuned, means including a frequency changer for effectively dividing one of said pair of signals by said predetermined ratio, and means for comparing the other of said pair of signals and the effectively divided signal to produce said error signal when there is a frequency difference between the compared signals.

4. Apparatus as in claim 3 wherein the frequency changer comprises means for frequency dividing said one of said pair of signals.

5. Apparatus as in claim 1 and further including filter means connected to the output of said modulator means such that said third and fourth signals are the upper sidebands.

6. Apparatus as in claim 1 wherein said receiving means further includes a mixer circuit responsive to said third and fourth signals and an intermediate frequency signal for producing corresponding sideband signals connected such that said demodulator means operates on said sideband signals.

References Cited in the file of this patent

UNITED STATES PATENTS

| | | |
|---|---|---|
| 2,028,880 | Runge et al. | Jan. 28, 1936 |
| 2,283,523 | White | May 19, 1942 |
| 2,530,614 | Hugenholtz | Nov. 21, 1950 |
| 2,724,742 | Chesnut | Nov. 22, 1955 |